Nov. 14, 1939.  W. L. ADAMS  2,179,972
FISHING REEL
Original Filed Sept. 28, 1931
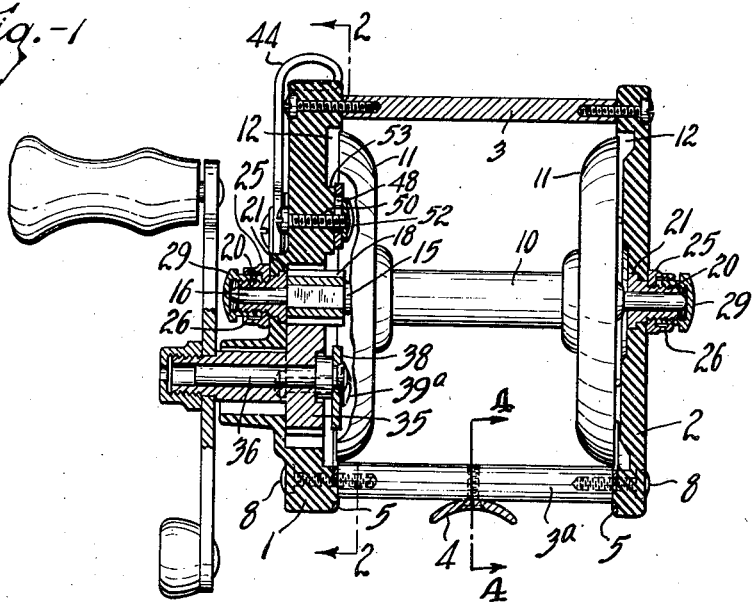
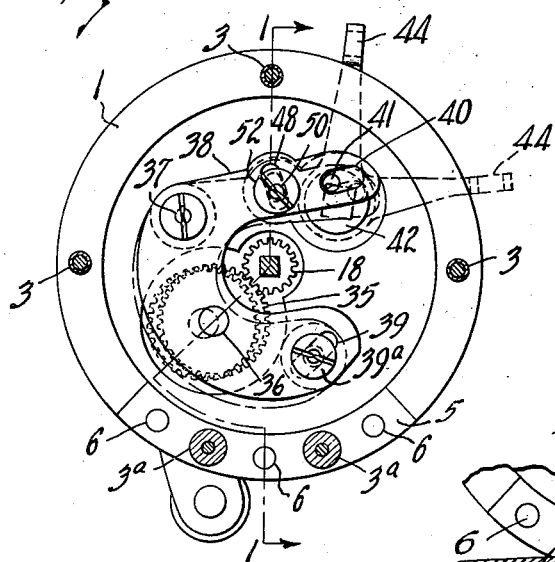
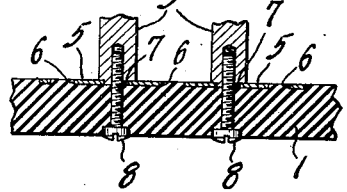
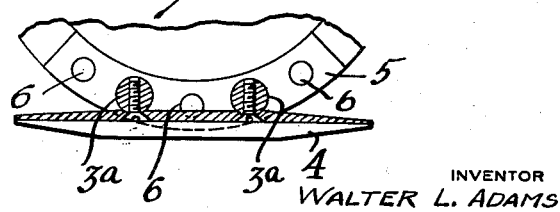
INVENTOR
WALTER L. ADAMS
BY Albert L. Ely
ATTORNEY Patented Nov. 14, 1939

2,179,972

UNITED STATES PATENT OFFICE 2,179,972

FISHING REEL

Walter L. Adams, Akron, Ohio, assignor to The Enterprise Manufacturing Company, Akron, Ohio, a corporation of Ohio Original application September 28, 1931, Serial No. 565,506. Divided and this application July 10, 1936, Serial No. 89,895

2 Claims. (Cl. 242—84.7)

The present invention relates to fishing reels and has for its objects and purposes the improvement of reels similar to existing types in order to strengthen and reinforce the same at points of greatest strain, as will be more fully set forth herein. The application is a division of my copending application for Letters Patent, Serial No. 565,506, filed September 28, 1931, which has matured into Patent No. 2,055,447.

It is one of the objects of the invention to improve upon mechanisms employed in reels which may be converted into free spool reels, and particularly to improve upon such reels as shown, for example, in the prior patent to the present inventor No. 1,608,287 of November 23, 1926. Reels of this general form comprise a shiftable plate which supports the crank shaft and gear; and is movable to bring the gear into and out of mesh with the pinion upon the spool shaft. When reels are constructed for the purpose of deep sea fishing, the strain and stresses exerted on the spool and the gearing are very heavy, and with former reels of this construction it was not uncommon for the mechanism to be forced or bent out of operative position by the strains exerted upon the spool. One of the objects of the invention is to improve upon this type of reel and to make it impossible for the gearing to be forced out of its proper operative position.

A further object of the invention is to improve upon the means employed for anchoring the cross plate in the ends of the reel, which are usually of a molded composition, either hard rubber or Bakelite. The construction shown and described herein strengthens the reel at the point of attachment between the cross plate and the reel frame.

There are other objects and advantages as will be understood by those skilled in the art, it being the intention to illustrate the best known form of the invention and not to confine the patent or the claims beyond their fair scope. It is also obvious that changes and modifications may be made in specific embodiments of the invention without departing therefrom.

Of the accompanying drawing,

Figure 1 is a side elevation of the reel structure, the end plates being shown in section on the line 1—1 of Figure 2;

Figure 2 is a section on the line 2—2 of Figure 1 showing an anchorage for the cross plate;

Figure 3 is a sectional view along the cross plate anchorage; and

Fig. 4 is a section on the line 4—4 of Fig. 1.

The reel structure is composed of a front plate 1 and a rear plate 2, each of which is composed of a suitable molded composition, such as hard rubber, Bakelite or the like. The plates are connected by the usual pillars 3, two of which, designated as 3ª, are somewhat heavier for attachment of the cross plate 4 by which the reel is mounted on the rod. Where large game fish are to be landed, the form of reel heretofore used, with the standard anchorage for the cross plate, has failed frequently at the point where the pillars are received in the end plates.

For the purpose of remedying this defect, the invention proposes to set in the flanges on the end plates a pair of arc-shaped metal plates 5 each of which extends around a substantial area of the end plate. These plates are set within recesses (formed in the end plates when they are molded) and are provided with a plurality of spaced openings 6 into which the molded material will be received so as to anchor the plate 5 on the end plate. The ends of the pillars 3ª are reduced, as shown in Figure 3, and each end received in a socket 7 in the end plate, the holding screws 8 passing into the pillars at the center thereof. It will be seen that the construction described gives a very substantial anchorage for the pillars and thus enables them to withstand excessive strains without breaking the composition end plates.

The spool is indicated at 10, being provided with flanges 11 which run in grooves 12 formed in the end plates. The spool is mounted upon the shaft 15 which is reduced at the ends, as shown at 16. At the end of the shaft near the front plate, the spool pinion 18 is mounted.

The mounting for the spool shaft 15 is the same at both ends, and comprises a bushing 20 that has an enlarged head 21 of hexagonal form at its inner end, said head seating in a similarly shaped socket formed in the end plate. The outer end portion of the bushing is screw threaded and receives a nut 25 that is formed with a tubular axial extension constituting a cup or circular seat 26 in which is seated a flattened spring ring (not shown). Threaded over the outer end of the bushing is a thrust bearing or cap 29 that has an axially extending sleeve that is received within the tension cup so that the spring ring therein bears against the sleeve to maintain the cap in position. The end of the shaft 15 bears against the inner surface of the cap 29 as shown. The arrangement is such as to facilitate the oiling and repairing of the reel, and permits the ready removal of the bushing 20.

In order to drive the reel, a gear 35 is secured to the reel crank shaft 36, meshing with the pinion 18 when in driving relation. To make the reel adjustable for free-spool operation, the shaft 36 is mounted in a shiftable bridge 38 which is angular or substantially U-shaped, as shown in Figure 2, being pivoted as at 37 to a post secured in the front plate 1. The bridge is so shaped and proportioned that when in the full line position shown in Figure 2, the gears 18 and 35 are in mesh. When moved to the dotted line position, the gears are out of mesh and the spool is free to turn upon its axis. The end plate is recessed to permit shifting of the crank shaft and gear.

One end or arm of the lever which constitutes the bridge is slotted as at 39 and received over a headed pin 39ª. The opposite end is provided with a slot 40 in which is located a pin 41 eccentrically located upon a rotatable post 42 which is mounted in the end plate and shifted by a lever 44. This is the construction shown in the prior Adams patent.

It has been found that excessive loads and strains to which these salt water reels are subjected cause them to bend and become displaced. I propose, therefore, to provide the arm of the lever near the operating point with a slot 48 and to receive therein a pin 50 mounted in the end plate. The end of the pin is provided with a cap 52 peened in place and bearing upon the lever or bridge. The end plate is formed with a boss 53 bearing against the under side of the bridge. This construction will hold the bridge in place and will prevent the objectionable results referred to, as the bridge is confined by the headed screws or pins upon opposite sides of the pivot point of the bridge.

Except as herein referred to, the reel structure is of standard or usual form and will not be further described. It is also possible to change the form or details of the features of improvement without in any way departing from the essentials of the invention as described and claimed herein.

What is claimed is:

1. In a reel structure, an end plate, a spool, a pinion on the spool, a lever pivoted intermediate its ends on the end plate, a crank shaft and driving gear carried on one arm of said lever adjacent its pivot, means associated with the free end of the other arm of the lever for shifting the lever to move said driving gear into and out of mesh with said pinion, the free end of the first mentioned arm having a slot therein beyond the driving gear, a headed pin extending through said slot and secured to the end plate, the other arm having a slot therein between the pivot and said shifting means, and a second headed pin extending through said last-named slot and secured to said end plate.

2. In a reel structure, an end plate, a spool, a pinion on the spool, a lever pivoted intermediate its ends on the end plate, a crank shaft and driving gear carried on one arm of said lever adjacent its pivot, means engaging the free end of said lever arm for holding it to the end plate, means associated with the free end of the other arm of the lever for shifting the lever to move the said driving gear into and out of mesh with said pinion, and means engaging the lever arm between the pivot and said shifting means for holding said arm to the end plate.

WALTER L. ADAMS.